US009286558B1

(12) United States Patent
Daniel

(10) Patent No.: US 9,286,558 B1
(45) Date of Patent: Mar. 15, 2016

(54) APPARATUS, SYSTEM AND METHOD OF TRANSMITTING MULTIMEDIA COMMUNICATIONS USING PRINTED STAMPS

(71) Applicant: Isaac S. Daniel, Miramar, FL (US)

(72) Inventor: Isaac S. Daniel, Miramar, FL (US)

( * ) Notice: Subject to any disclaimer, the term of this patent is extended or adjusted under 35 U.S.C. 154(b) by 0 days.

(21) Appl. No.: 14/509,951

(22) Filed: Oct. 8, 2014

Related U.S. Application Data

(60) Provisional application No. 61/888,339, filed on Oct. 8, 2013.

(51) Int. Cl.
*G06F 17/00* (2006.01)
*G06K 19/06* (2006.01)
*G06K 7/10* (2006.01)
*G06F 3/0481* (2013.01)
*G06F 3/0489* (2013.01)

(52) U.S. Cl.
CPC ...... *G06K 19/06037* (2013.01); *G06F 3/04817* (2013.01); *G06F 3/04897* (2013.01); *G06K 7/10861* (2013.01); *G06K 19/06103* (2013.01); *G06Q 2250/00* (2013.01)

(58) Field of Classification Search
CPC ............... G07B 17/00024; G07B 17/00508; G07B 17/00193; G07B 17/00362; G07B 17/00435; G07B 2017/00443; G07B 17/0008; G07B 17/00314; G07B 17/00661; G07B 17/00733; G07B 2017/00032; G07B 2017/0012; G06Q 20/10; G06Q 10/0831; G06Q 20/00; G06Q 20/02; G06Q 20/12; G06Q 20/14; G06Q 20/363; G06Q 20/40145; G06Q 30/06; G06K 19/06028; G06K 19/06046; G06K 5/00; G06K 7/12
USPC .................................. 235/375, 380, 382, 492
See application file for complete search history.

(56) References Cited

U.S. PATENT DOCUMENTS

| | | | | |
|---|---|---|---|---|
| 5,982,350 A * | 11/1999 | Hekmatpour et al. | ........ | 345/629 |
| 6,226,626 B1 * | 5/2001 | Thiel | ............... | 705/407 |
| 6,282,525 B1 * | 8/2001 | Kubatzki et al. | .............. | 705/410 |
| 8,905,304 B1 * | 12/2014 | Daniel | ........... | 235/380 |
| 2004/0108386 A1 * | 6/2004 | Rasti | ............. | 235/494 |
| 2006/0190418 A1 * | 8/2006 | Huberty et al. | ............... | 705/402 |
| 2007/0143232 A1 * | 6/2007 | Auslander et al. | ............ | 705/408 |
| 2012/0232970 A1 * | 9/2012 | Kara | ............. | 705/14.4 |

* cited by examiner

*Primary Examiner* — Thien M Le
(74) *Attorney, Agent, or Firm* — Carol N. Green Kaul, Esq.

(57) ABSTRACT

An interactive postage stamp displayable on a mail item 102 evidencing payment of postage, and represented by an encoded image framed by an interactive frame that includes at least one embedded icon activated by scanning the interactive frame causing the activation of the at least one embedded icon, where upon activation the at least one embedded icon may be engaged for accessing the multimedia content linked to the interactive postage stamp, and for controlling the review of the multimedia content using control commands represented by the activated at least one embedded icon or at least one hyperlink within the activated interactive frame.

16 Claims, 9 Drawing Sheets

APPARATUS, SYSTEM AND METHOD OF TRANSMITTING MULTIMEDIA COMMUNICATIONS USING PRINTED STAMPS

PRIORITY CLAIM

This patent application is a Non-Provisional patent application and claims priority under 35 U.S.C. §119(e) to U.S. Provisional Patent Application Ser. No. 61/888,339, titled "A System and Method of Transmitting Multimedia Communications Using Printed Stamps" filed Oct. 8, 2013. The entire disclosure of the afore-mentioned patent application is incorporated by reference as if fully stated herein.

FIELD OF THE INVENTION

An interactive postage stamp displayable on a mail item 102 evidencing payment of postage, and represented by an encoded image framed by an interactive frame that includes at least one embedded icon activated by scanning the interactive frame causing the activation of the at least one embedded icon, where upon activation the at least one embedded icon may be engaged for accessing the multimedia content linked to the interactive postage stamp, and for controlling the review of the multimedia content using control commands represented by the activated at least one embedded icon or at least one hyperlink within the activated interactive frame.

DESCRIPTION OF THE PRIOR ART

In the Internet age, there is a present sentiment that traditional greeting cards have lost their relevance as communications via social media are so prevalent. It is believed that consumers prefer to forego the cost and time required for sending holiday cards as it is much easier and more convenient to send for example, an email blast to a plurality of recipients. However, not everyone agrees, as there is still a significant portion of the population that enjoys receiving a personal greeting card in the mail. There is an element of surprise and eager anticipation, when the recipient receives mail that is not a bill. Further, the personal touch cannot be overstated. As such, the industry works really hard at trying to devise new products and incorporate new ideas that are relevant to the culture, and still allow those who like to send and/or receive traditional greeting cards to have the option to do so.

With that said greeting cards with recorded voices and other newer product lines have been introduced over the last few years. However, these recorded greeting cards still have not been able to capitalize on further advancements in technology in like manner as an email greeting that has the ability to include for example a photograph of a loved one and a quick note. Thus, there needs to be an efficient means of communicating personal greetings or information incorporating technology that is easy to use and convenient to transmit and receive. This invention satisfies these long felt needs in a new and novel manner and solves the foregoing problems that the prior art has been unable to resolve.

For a further and more fully detailed understanding of the present invention, various objects and advantages thereof, reference is made to the following detailed description and the accompanying drawings. Additional objectives of the present invention will appear as the description proceeds.

The foregoing and other objects and advantages will appear from the description to follow. In the description, references are made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views. The following detailed description is, therefore, not to be taken in a limiting sense, and the scope of the present invention is best defined by the appended claims.

BRIEF DESCRIPTION OF THE DRAWINGS

Further objectives and advantages of the present invention may be derived by referring to the detailed description and claims when considered in connection with the Figures, wherein like reference numbers refer to similar items throughout the Figures.

DETAILED DESCRIPTION OF PREFERRED EMBODIMENTS

Figure 1:
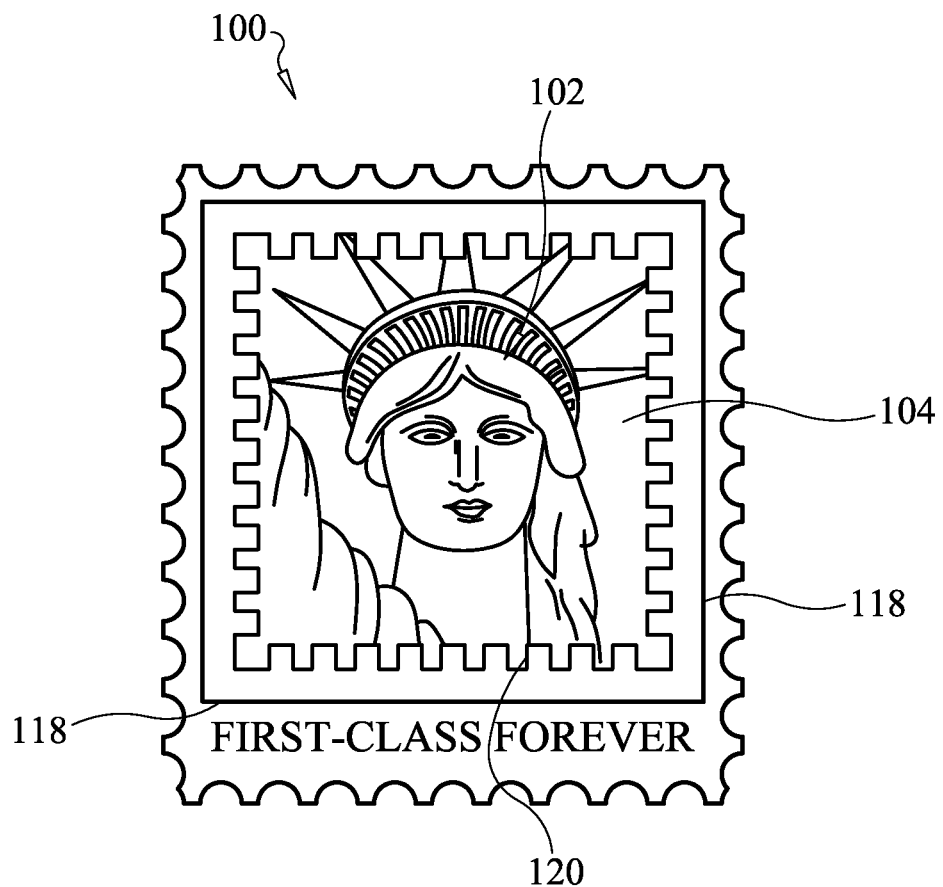
FIG. 1 is an exemplary apparatus according to one embodiment of the invention.

The following discussion describes in detail an embodiment of the various methods as described below. However, this discussion should not be construed, as limiting the invention to those particular embodiments, as practitioners skilled in the art will appreciate that an apparatus and system may vary as to configuration and as to details of the parts, and that a method may vary as to the specific steps and sequence, without departing from the basic concepts as disclosed herein. Similarly, the elements described herein may be implemented separately, or in various combinations without departing from the teachings of the present invention. Turning now descriptively to the drawings, in which similar reference characters denote similar elements throughout the several views.

Apparatus & Systems

FIG. 1 is an exemplary apparatus, 100, i.e. an interactive postage stamp 100, according to one embodiment of the invention. Postage stamp 100 as used herein describes the purchasable small piece of paper comprising of adhesive on the rear, for securely affixing the interactive postage stamp 100 to a mail item 102 (e.g. an envelope or other postal cover (box, package, postcard and other mailing containers), which when purchased and displayed on the mail item 102 evidences payment of postage as are well known and used in the arts. The interactive postage stamp 100 may be purchased from a postal administrator, e.g. the United States Post Office or any other authorized vendor (e.g. www.STAMPS.com) for paying mail delivery costs. Interactive postage stamp 100 may be printed on custom made paper and comprises a denomination representative of applicable costs for mail delivery. Interactive postage stamp 100 may be in any shape, e.g. rectangular, triangular, square and the like.

The interactive postage stamp 100 of the invention is displayable on a mail item 102 and represented by an encoded image 104 framed by an interactive frame 106 that includes at least one or more embedded icons 108, 108' activated by scanning the interactive frame 106 causing the activation of the at least one embedded icon 108, where upon activation, the at least one or more embedded icons 108, 108' may be engaged for accessing the multimedia content 110 linked to the interactive postage stamp 100, and for controlling the review of the multimedia content 110 using control commands represented by the activated the at least one or more embedded icons 108, 108' or at least one or more hyperlinks within the activated interactive frame 106. The image 104 displayed in the interactive frame 106 comprises of words, pictures, drawings, avatars individually or in any combination thereof. Multimedia content 110 as used herein comprises of for example, information, greetings 110 and the like in any one or more of the following: text, pictorial, video, audio, or graphics.

As shown, the exemplary interactive postage stamp 100 includes an image 104 within an interactive frame 106 with at least one or more activated (hot) corners 112, 114, 116, 118 with at least one or more hyperlinks or icons 108, 108' embedded within. The exemplary interactive postage stamp 100 includes additional markings 120, 122 that distinguish it from the regular stamps, such that it visually indicates to a casual observer that there is more to the interactive postage stamp 100 than the printed image and/or words. The interactive stamp 100 may be used to electronically transmit domestically and/or internationally, a greeting 110 in multimedia format whereby upon receipt of the mail item 102, the recipient may scan the interactive frame 106 to access and control the personalized greeting 110 linked to the interactive postage stamp 100.

Figure 2:
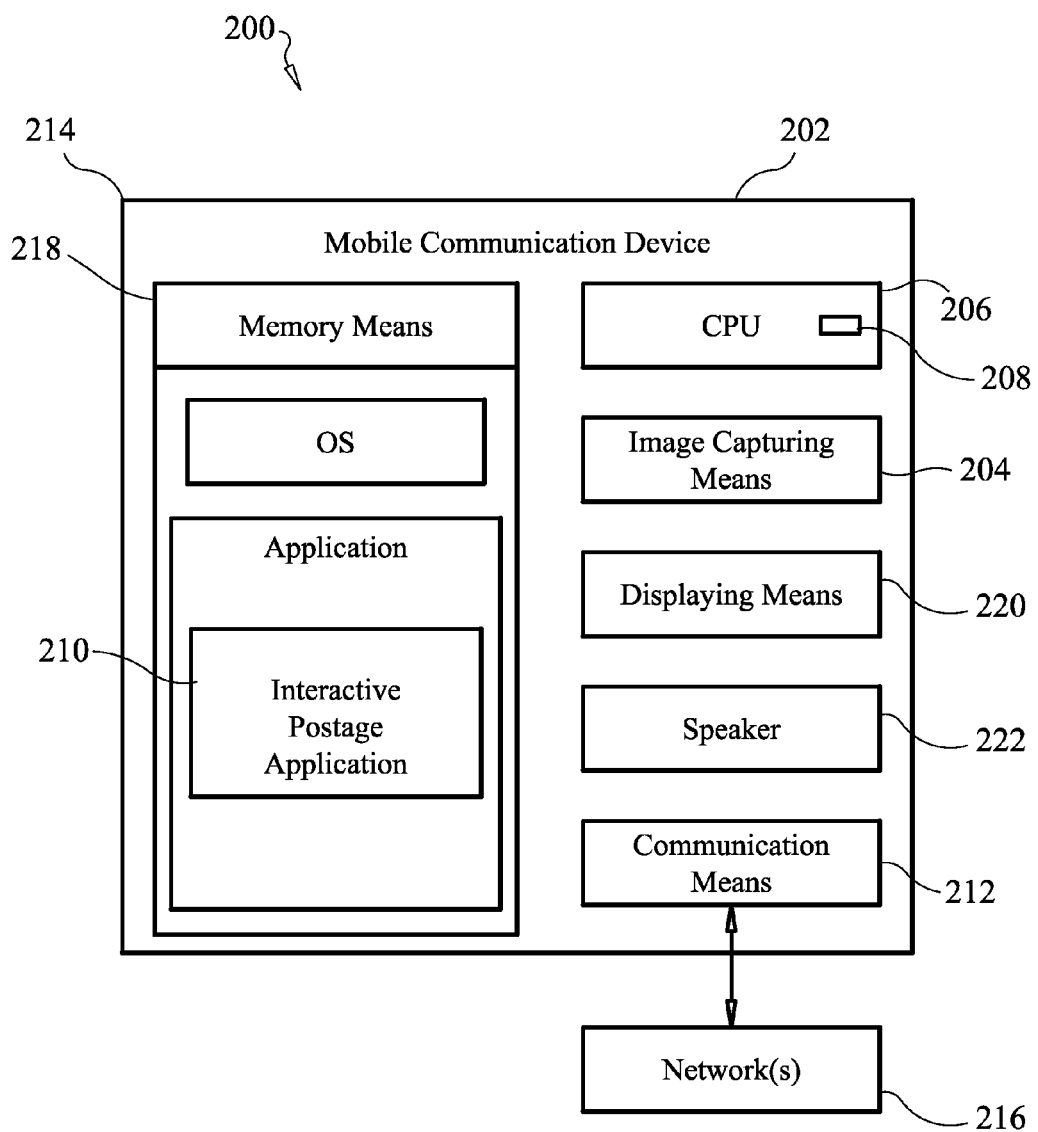
FIG. 2 is an exemplary system of the invention according to one embodiment.

FIG. 2 shows an exemplary system 200 of the invention according to one embodiment. System 200 comprises an interactive postage stamp 100 displayable on a mail item 102 202 evidencing payment of postage, and represented by an encoded image 104 framed by an interactive frame 106 that includes at least one or more embedded icons 108, 108' activated by scanning the interactive frame 106 causing the activation of the at least one or more embedded icons 108, 108', where upon activation the at least one or more embedded icons 108, 108' may be engaged for accessing the multimedia content 110 linked to the interactive postage stamp 100, and for controlling the review of the multimedia content 110 using control commands represented by the activated at least one or more embedded icons 108, 108' or at least one hyperlink within the activated interactive frame 106.

System 200 further comprises an exemplary mobile communication device 202, that includes an image capturing device 204 (e.g. camera) electronically connected to at least one computer processor 206 both positioned within, wherein the image capturing device 204 is used for scanning the interactive frame 106 to access the multimedia content 110. The mobile device's at least one computer processor 206 is electronically connected to a non-transitory computer readable medium, includes computer executable instructions 208 readable and executable by the at least one computer processor 206 and configured for launching an interactive postage application program ("postage app") 210, programmed for executing the commands represented by the activated at least one or more icons 108, 108' to control the review of the multimedia content 110.

As shown in FIG. 2, mobile communication device 202 may be any type of electronic computerized device configured with communication means 212 for communicating wirelessly and/or wired with other networked enabled mobile communication device 202, 202', such as but not limited to, cellular phones (e.g., an iPhone, Android, Palm, Blackberry, or any "smart phone" as are generally known and used in the arts), location-aware portable phones (such as GPS), a personal computer, server computer, or laptop or netbook computer, a personal digital assistant ("PDA") such as a Palm-based device or Windows CE device, a laptop computer, a tablet personal computer 214, a portable screen, a portable processing device and/or any other portable device capable of communicating wirelessly over a computer network, local area network, wide area network such as the Internet 216, or any other type of network device that may communicate over a network 216. Computer 214 includes but is not limited to a network enabled computer, a laptop or personal digital assistant subject to wired/wireless connectivity, which is configured with a computer processor 206.

Mobile communication device 202 may include various hardware components, e.g. a computer central processor 206, memory means 218, and one or more communication means 212. Central processor 206 may be any type of processor, such as, but not limited to, a central processing unit (CPU), a microprocessor, a video processor, a front end processor, a coprocessor, a single-core central processor, a multi-core processor, and the like. Central processor 206 may be programmed to activate the postage app 210 for recording greetings 110, e.g. music, videos, messages, statement, etc., which may be accessed from the interactive postage stamp 100 as displayed on the mobile device's displaying means 220 in for example, a graphical, audio, and/or text format, when the interactive postage stamp 100 is scanned by the mobile device's image capturing means 204 activating the one or more embedded icons 108, 108' embedded within the interactive frame 106 such that the activated one or more embedded icons 108, 108' may be engaged to control the review of the multimedia content 110.

Postage app 210 may be accessed from a mobile communication device 202 that may be represented thereon by an icon 108 that may be used to launch and access the postage app 210 when a user selects the postage app's icon 108 using an input device (e.g. by touching a touchscreen, or selecting it using a pointing device, roller ball, arrow keys, or other controller), for creating a greeting 110, retrieving and/or displaying a recorded greeting 110 as transmitted and accessible via the interactive postage stamp 100 upon receipt of mail item 102.

Mobile communication device 202 is equipped with communication means 212 either electrically or mechanically connected to its computer processor 206 both of which are positioned within. In the case of electronic connections, the electronic connections may be wired and/or wireless. In some embodiments, communication means 212 may be a wireless communication means 214, which employ short range wireless protocol, such as, but not limited to, a radio frequency transceiver, a radio frequency receiver, and/or a radio frequency transmitter. In embodiments where the wireless communication means 212 is a radio frequency receiver, the radio frequency receiver may be any type of radio frequency receiver, including, but not limited to, a positioning system receiver, such as a global positioning system receiver and a local positioning system receiver, such as a Wi-Fi positioning system receiver. In other embodiments, the communication means 212 may employ wireless protocols like Blue Tooth, ZigBee, 702.11 series, or a wireless modem, such as, but not limited to, a global system for mobile communications (GSM) modem, or any other short range wireless protocol that is well known and used in the arts and other future short range wireless protocol suitable for transmitting and receiving data. Communication means 212 are operative to transmit or receive electronic communications, i.e. data, text, photo ads, and the like via a short range wireless protocol, such as, but not limited to, a radio frequency receiver, a radio frequency transmitter, or a radio frequency transceiver.

In some embodiments, mobile communication device 202 may include at least one memory means 218 either electrically or mechanically connected to the at least one computer processor 206. In the case of electronic connections, the electronic connections may be wired and/or wireless connections. Memory means 218 may comprise of a storage device and may include memory, such as, but is not limited to, read-only memory, such as CD-ROMs, DVDs, floppy disks, and the like, read and write memory, such as a hard drive, floppy disc, CD-RW, DVD-RW, solid state memory, such as solid state hard drives, flash memory, and the like, and random access memory. The information stored thereon may be retrieved from memory means 218 using the computer processor 206. Processor 206 may also be programmed to retrieve a corresponding multimedia greeting 110 associated with the interactive postage stamp 100, which upon retrieval the multimedia greeting 110 will be displayed on the mobile device's displaying means 220. In some embodiments, mobile communication device 202 also includes a speaker 222 for broadcasting the at least one multimedia greeting 110 using the type and configuration of speakers 218, 218' that are well known and used in the arts for mobile communication devices 202, 202'.

Computer processor 206 positioned within the mobile communication device 202 includes computer executable instructions 208, where the computer executable instructions 208 are operative to perform all the necessary functions for the system 200 and methods disclosed herein, including but not limited to launching the postage app 210. Computer executable instructions 208 may be loaded directly on the mobile device's processor 206, or may be stored in mobile device's memory means 218, such as, but not limited to, computer readable media, such as, but not limited to, a hard drive, a solid state drive, a flash memory, random access memory, CD-ROM, CD-R, CD-RW, DVD-ROM, DVD-R, DVD-RW, and the like. The computer executable instructions 208 may be any type of computer executable instructions 208, which may be in the form of a computer program, the program being composed in any suitable programming language or source code, such as C++, C, JAVA, JavaScript, HTML, XML, and other programming languages.

Computer executable instructions 208 are readable and executable by the computer processor 206 and configured for performing any and all the necessary functions for the system 200 and methods disclosed herein which may include any one or more of the following: launching a postage app 210 for controlling multimedia content 110 embedded within a postage stamp 100 displayable on a mail item 102 evidencing payment of postage (in full or partial payment), and represented by an encoded image 104 within an interactive frame 106 that includes at least one or more embedded hyperlink or icons 106, 106' embedded within; receive at least one recorded multimedia greeting 110 for posting with the interactive postage stamp 100 for retrieval by the recipient of the mail item 102, retrieving the recorded greeting 110 to be displayed on the mobile device's displaying means 220; and displaying the at least one multimedia greeting 110 on the mobile device's displaying means 220; receiving at least one control command 302 for scanning the encoded image 104 within the interactive frame 106; scanning the encoded image 104 within the interactive frame 106 with the at least one or more hyperlinks or icons 108, 108' embedded within; activating the at least one icon 108 for controlling the multimedia content 110; receiving a control command 302 for controlling the multimedia content 110 when the at least icon 108 from an activated corner 112 overlays the encoded image 104; controlling the at least one multimedia content 110 correlating to encoded image 104 responsive to the control command 302; receiving a control command 302 for editing the multimedia content 110 when the at least one icon 108 for editing overlays the encoded image 104; receiving the multimedia content 110 and any edits, which may further include the step of uploading content or retrieving stored content from for example the mobile communication device's memory means 218; and storing the at least one multimedia content 110 by linking the content with the postage stamp's interactive frame 108. The at least one recorded greeting 110 may be published in any one or more of the following formats: audio, video, pictorial, graphical or text format.

Mobile communication device 202 may include any kind of displaying means 220, such as, but not limited to: a liquid crystal display ("LCD") screen, a light emitting diode ("LED") display, touchpad or touch screen display, and/or any other means known in the arts for emitting a visually perceptible output. Mobile device's processor 206 is in electronic communication with its displaying means 220 for controlling content displayed thereon. In other embodiments, displaying means 220 is wirelessly connected to processor 206. Displaying means 220 may include control means, such as, but not limited to, a touch screen, a stylus, and the like. In some embodiments, displaying means 220 may be electronically connected to a mobile communication device 202 according to the hardware and software protocols that are known and used in the arts. Computer central processor 206 controls the mobile device's displaying means 220, which is configured for displaying the multimedia greetings 110 from the interactive postage stamp 100.

System 200 further comprises a postage app 210, which may comprise in part of a browser, such as for use on the mobile communication device 202, or a similar browsing device. The postage app 210 may be any type of software application, such as a standalone application designed to run on a mobile platform, such as a mobile device running an operating system, such as iOS™, Android™, Windows Mobile™, Blackberry™, and the like. greeting app 210 may be operative for an iPhone, any other "smart phone", mobile device, cellular phone, PDA, GPS or any other mobile communication device 202 capable of handling transactions dealing with dynamic content, object, application, or software.

In some embodiments, postage app 210 may reside on a server and/or on a mobile communication device 202, where the server computer 106 may have a software program residing in memory. Mobile communication device 202 may have the postage app 210 residing in local memory or the postage app 210 may be downloadable to the mobile communication device 202 from the server. For example, in one embodiment, the postage app 210 may be on a mobile device (such as an iPhone, Blackberry, or other 'smart phone') and the full-sized software program may be on a computer, where communications may occur over a network or directly, either wired or wirelessly.

In either embodiment, computer executable instructions 208 readable by processor 206, (i.e. the server's computer processor 206' or the mobile device's processor 206) are operative to launch the postage app 210 for displaying multimedia greetings 112, 112' on the mobile communication device 202.

Figure 3:
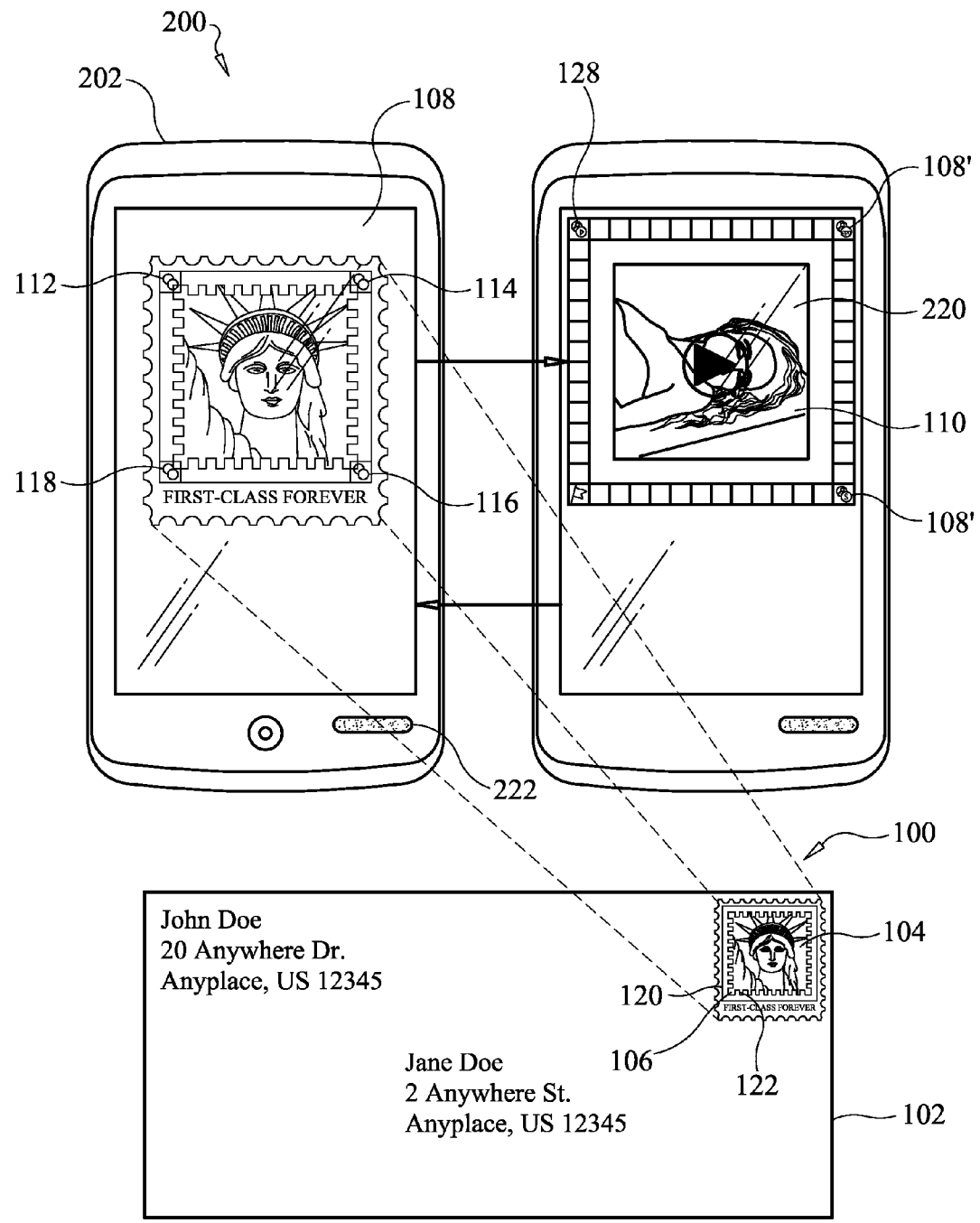
FIG. 3 shows an example of the system and method of the greeting app in use according to another embodiment.

FIG. 3 shows an example of the postage app 210 of the system 300 *n* use according to one embodiment of the invention. In one embodiment, the postage app 210 may appear as an icon 108 that may be manually activated to launch the app 210, while in some embodiments the postage app 210 is automatically launched as soon as the mobile communication device 202 is turned on. The interactive postage stamp 100 includes an encoded image 104 within an interactive frame 106 with at least one or more hyperlinks or icons 108, 108' embedded within. When the mobile device's image capturing means 124, e.g. a camera of the like and kind that are well known and used in the arts for mobile phones 102, hovers over, at, or near the interactive postage stamp 100 and scans the encoded image 104 within the interactive frame 106, it causes the at least one or more the interactive frame 106 to be activated and the activated icons 106, 106' that were previously embedded now become active and visible in the activated corners 112, 114, 116, 118, where the icons 106, 106' may be engaged for executing the commands they represent for creating, displaying, editing and/or storing of the corresponding multimedia greeting 110.

The multimedia greeting 110 to be created for mailing or displayed as received from the mailed item is controlled by overlaying the at least one image 104 within the interactive frame 106 with at least one icon 108 that represents a control command 302 for controlling the reviewing (e.g. editing and display) of the multimedia greeting 110. The activation of the at least one or more hot corners 112, 114, 116, 118 allows the embedded icons 108, 108' or hyperlinks to become visible, i.e. the icons 108, 108' may pulsate, blink or displayed in a color contrast or animated format to alert the user of the option to interact with the encoded image 104 by exploring one or more of the interactive control commands 302, 302'. In some embodiments, control commands 302, 302' are fully displayed, e.g. "ADD GREETING" or "DISPLAY GREETING". As shown the icons 108, 108' are depicted as a magnifying glass shaped icon 108. It is understood that the clickable icon 108 may be in any particular geometric shape (square, blob, fish etc.) or other configuration as it is representative of a control command 302 for controlling the multimedia greeting 110 for the interactive postage stamp 100.

To add a greeting, user may create a new multimedia greeting 110 by creating a new recording of a video or audio, or select a multimedia greeting 110 from a selection of stored multimedia greetings 112, 112' that gets stored on the interactive postage stamp 100. Once the multimedia greeting 110 is stored and the mail item 102 is sent, the recipient upon receipt of may use his/her mobile device's displaying means 220 to access the stored embedded multimedia greeting 110.

As such, upon receipt of the mailed item 102 with the interactive postage stamp 100, by using a mobile communication device 202, user may interact with the exemplary interactive postage stamp 100, by employing the postage app 210 which comprises of computer executable instructions 208', readable and executable by the computer processor 206 and configured for controlling the retrieval of the embedded multimedia content 110. When user scans the coded image 104 within the interactive frame 106, it causes the embedded icons 108, 108' to become activated and they become visibly displayed in the activated corners 112, 114, 116, 118, where user may engage any one icon 108 using an user input device and overlay the encoded image 104 with the now visible activated at least one icon 108, representative of a command 302, for controlling the review of the multimedia greeting 110. The display of the multimedia greeting 110 may be controlled by the postage app 210, with full functionality for review and control using control commands 108, 108', which include but are not limited to any one or more of the following: play, stop, fast-forward, rewind, pause, maximize viewing, minimize, end and cancel.

Figure 4:
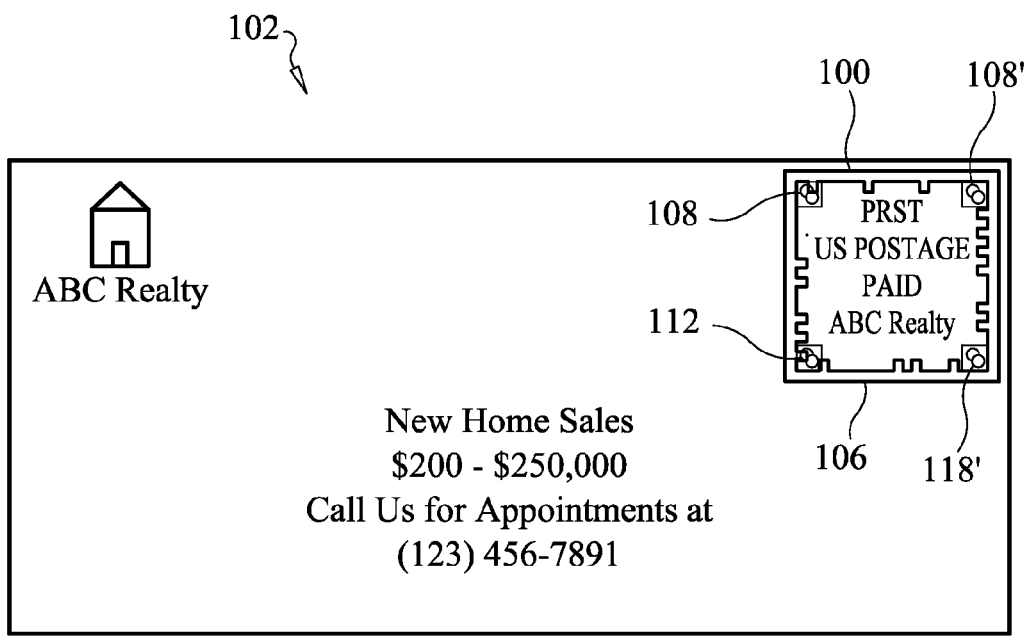
FIG. 4 shows another exemplary embodiment of the system of the invention.

FIG. 4 shows another exemplary embodiment of the system 400 of the invention. Many advertisers, e.g. realtors, buyers wholesale clubs, etc. use presorted printed mailers 102, 102' to advertise new promotions to their customers. These mailers 102 are generally the size of a greeting card and hold limited information as they are constrained by their size. In this embodiment, advertisers may include additional recorded greetings 110 in multimedia format as embedded content with the interactive postage stamp 100 as mailed to the consumers. At user's leisure, upon receipt user may review the at least one multimedia content 110, and his/her mobile communication device 202 hovers over, at, or near the interactive postage stamp 100, the postage app 210 retrieves the corresponding multimedia content 110 and displays it on the mobile device's displaying means 220, or on the interactive postage stamp 100. The multimedia content 110 is controlled by the postage app 210 with full functionality for review and control using control commands 140, 140', which include but are not limited to any one or more of the following: play, stop, fast-forward, rewind, pause, maximize viewing, minimize, end and cancel.

Figure 5:
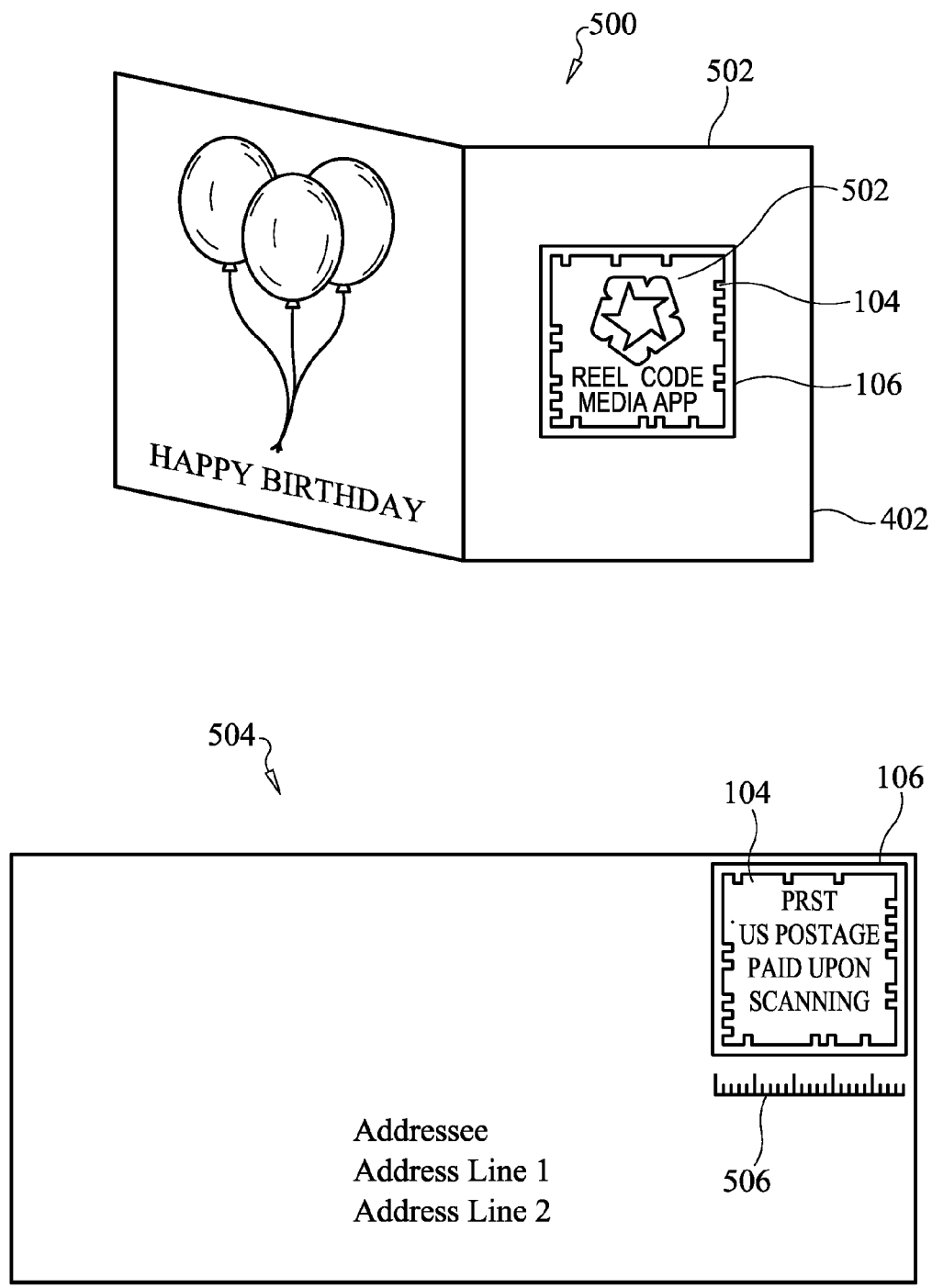
FIG. 5 shows another exemplary embodiment of the system of the invention.

FIG. 5 shows an example of the system 500 in use according to one embodiment. In some embodiments of the invention, an interactive card 502 may be purchased with the multimedia greeting 110 already stored thereon or is editable, allowing for customized greeting 110 to be stored thereon. As shown, the interactive card 502, a birthday greeting card 502 includes a coded image 104 within an interactive frame 106 where the icons 108, 108' for controlling the reviewing of the embedded multimedia content 110 are embedded within the interactive frame 106. User may customize the birthday greeting 110 by hovering over, at or near the coded image 104, scanning the encoded image 104 within the interactive frame 106, causing the activation of the embedded at least one or more icons 108, 108' to become activated and visible within the activated hot corners 112, 114, 116, 118 where they may be engaged to execute the respective command 302, e.g. create greeting 110, display greeting 110, edit greeting 110 and/or store greeting 110. In some embodiments, the icons 108, 108' represent hyperlinks to Uniform Resource Locator ("URL") addresses to websites that may be linked to for accessing the embedded multimedia content 100 that is being mailed through the postal service. The URL's may be advertiser owned or user may select a URL to be transmitted as a hyperlink for the interactive postage stamp 100, mail item 102 or the interactive card 502.

Upon activation, user may overlay the encoded image 104 with an activated icon 108 for the respective control command 302 for adding a multimedia greeting 110 from its respective activated corner 112 by dragging the icon 108 to a designated area 502 and thereby controlling the multimedia greeting 110, e.g. adding the multimedia greeting 110 with full functionality for review and control. Designated area 502 may be any area in or around the interactive frame 106 or the mail item 102. The multimedia greeting 110 is stored on the encoded image 104 within the interactive card 502 and is now ready for mailing.

In some embodiments, the mail item 102, e.g. the card's envelope 102 may include a preprinted interactive postage stamp 100 that also comprises an interactive frame 100 with embedded at least one or more icons 108, 108'. The exemplary mail item 102 includes a barcode 406 as well as an interactive frame 106. The interactive frame 106 may be used as an advertising tool for advertisers to for example, promote the greeting card company or any other advertiser who wants to use the interactive frame 106 with embedded hyperlinks capable of hyperlinking to the advertiser's website for multimedia content 110 when the interactive postage stamp 100 is scanned with mobile device's image capturing means 124.

The printed barcode 506 may be used to scan the price of the interactive greeting card 402 but also to make or collect payment for postage. As such, conceivably a user could purchase the interactive card 402, add a multimedia greeting 110 and within minutes, mail the interactive greeting card 402 shortly thereafter without having to worry about needing an additional stamp for postage. The recipient of the interactive greeting card 402 upon receipt of the same, may use his/her mobile communication device 202 to scan the image 128, which activates the hot corners 112, 114, 116, 118 and by overlaying the image 128 with an icon 108, the corresponding command 302, e.g. "DISPLAY GREETING" is initiated and the postage app 210 retrieves the multimedia greeting 110 for display.

Methods

Figure 6:
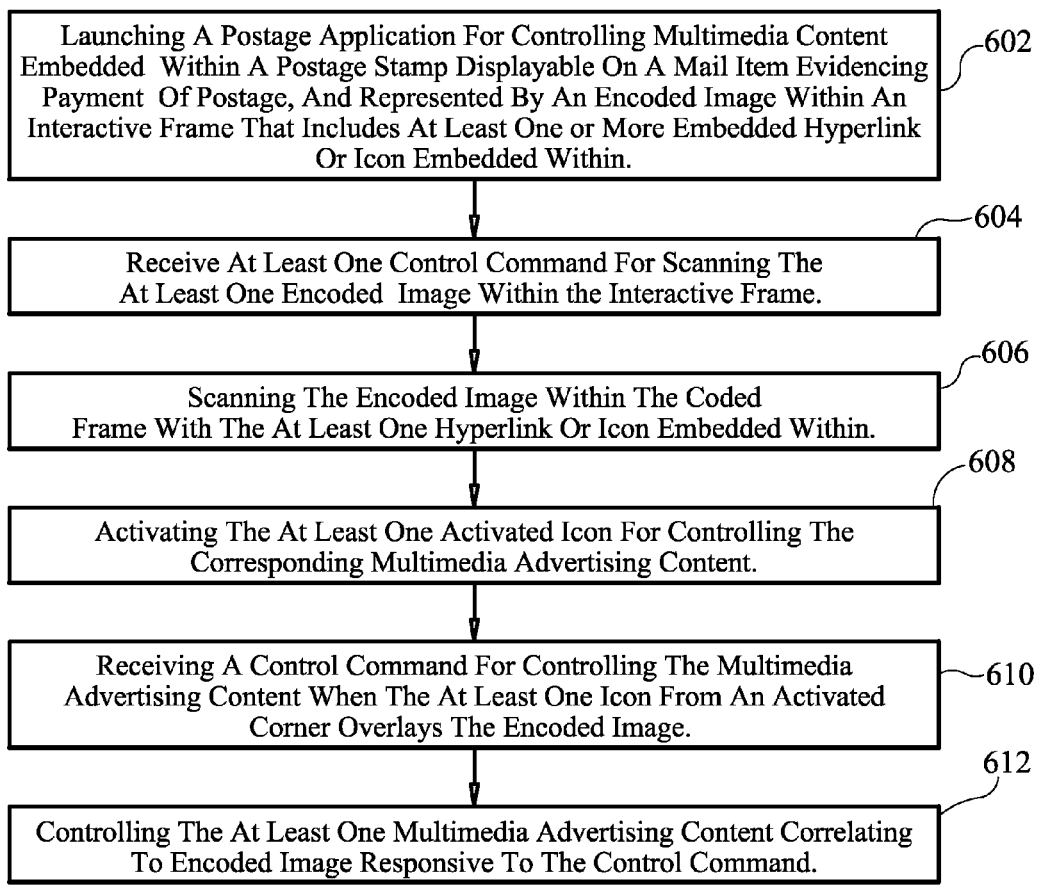
FIG. 6 shows another exemplary embodiment of the system of the invention.

FIG. 6 shows a block diagram depicting a method 600 in accordance with one embodiment. Method 600 comprises using at least one computer processor 206, electronically connected to a non-transitory computer readable medium (e.g. memory means 218), wherein the at least one computer processor 206 includes computer executable instructions 208 readable and executable by the computer processor 206 and is configured for launching a postage app 210 for controlling multimedia content 110 embedded within a postage stamp 100 displayable on a mail item 102 evidencing payment of postage (in full or partial payment), and represented by an encoded image 104 within an interactive frame 106 that includes at least one or more embedded hyperlink or icons 106, 106' embedded within (step 602). Method 600 further comprises receiving at least one control command 302 for scanning the encoded image 104 within the interactive frame 106 (step 604); scanning the postage stamp's encoded image 104 within the interactive frame 106 with the at least one or more hyperlinks or icons 108, 108' embedded within (step 606).

Method 600 further comprises activating the at least one activated icon 108 from the activated corner 112 for controlling the corresponding multimedia content 110 (step 608); receiving a control command 302 for controlling the multimedia content 110 when the at least activated icon 106 (that is visible once activated) from an activated "hot" corner 112 overlays the encoded image 104 (step 610); and controlling the at least one multimedia content 110 correlating to encoded image 104 responsive to the control command 302 (step 612).

Multimedia content 110 may include any one or more of the following: videos, greetings, adverts, promotions, coupons, coupon codes, bar codes, radio advertisements, print advertisements, movies, and movie trailers and or any other multimedia format that can be transmitted. The multimedia content 110 may be displayed within the interactive frame 106 and/or the mobile communication device's displaying means 220 with full functionality for implementing review and control commands, which include any one or more of the following: play, stop, fast-forward, rewind, pause, maximize viewing, minimize, and cancel.

Figure 7:
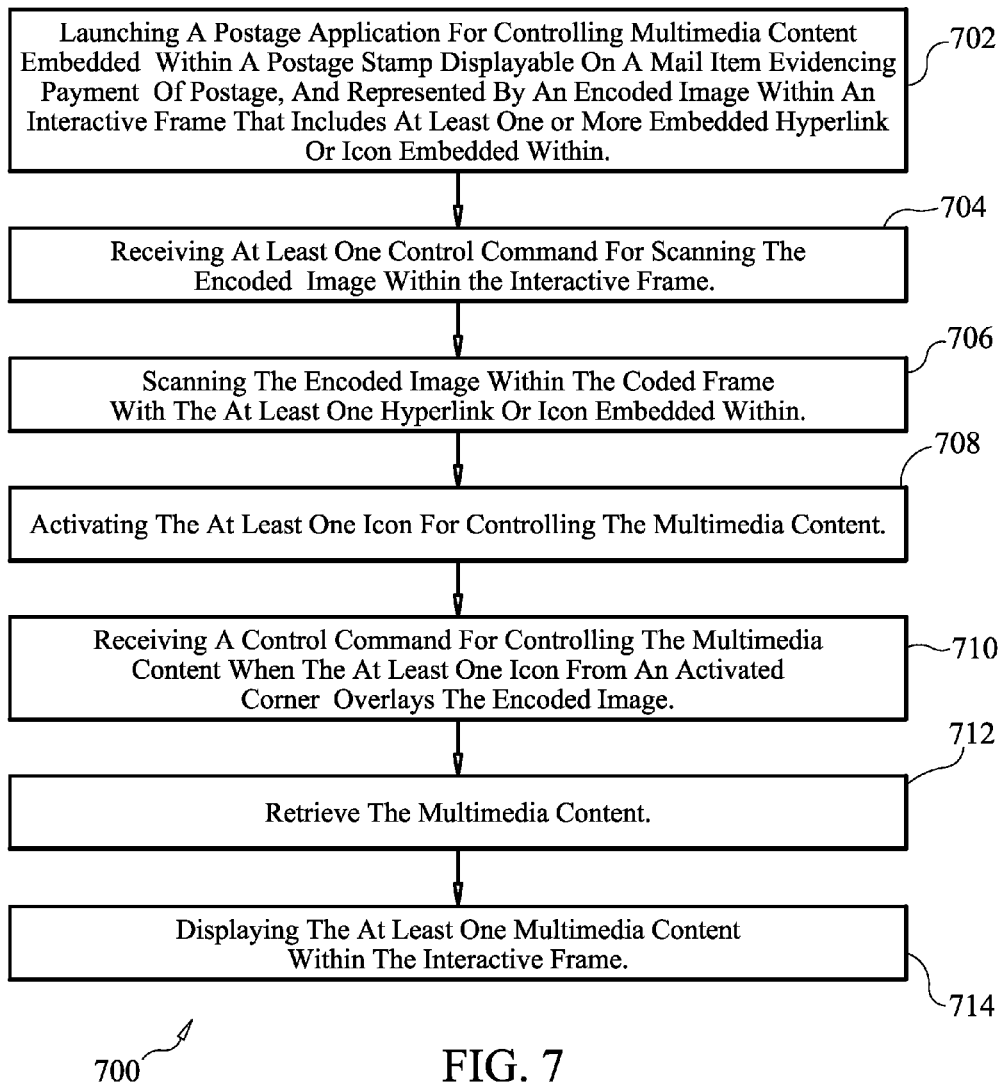
FIG. 7 shows another exemplary embodiment of the system of the invention.

FIG. 7 shows a block diagram depicting a method 700 in accordance with one embodiment. Method 700 comprises launching a postage app 210 for controlling multimedia content 110 embedded within a postage stamp 100 displayable on a mail item 102 evidencing payment of postage (in full or partial payment), and represented by an encoded image 104 within an interactive frame 106 that includes at least one or more embedded hyperlink or icons 106, 106' embedded within (step 702). Method 700 further comprises receiving at least one control command 302 for scanning the encoded image 104 within the interactive frame 106 (step 704); scanning the encoded image 104 within the interactive frame 106 with the at least one or more hyperlinks or icons 108, 108' embedded within (step 706).

Method 700 further comprises activating the at least one icon 108 for controlling the multimedia content 110, e.g. the greeting (step 708); receiving a control command 302 for controlling the multimedia content 110 when the at least one icon 108 from an activated corner 112 overlays the encoded image 104 (step 710). Method 700 further comprises retrieving the multimedia content 110 (step 712) and displaying the at least one multimedia content 110 within the interactive frame 106 (step 714) on the mobile communication device's displaying means 220 or the postage stamp 100. The multimedia content may stored within the mobile device's memory means 218 or may require hyperlinking to a URL. Accordingly, the step of retrieving the at least one multimedia content 110 further comprises retrieving the encoded image 104 from any one of the following: the mobile device's memory means 218; hyperlinking to an advertiser's website via its web address, or hyperlinking to the application's server's memory means.

Figure 8:
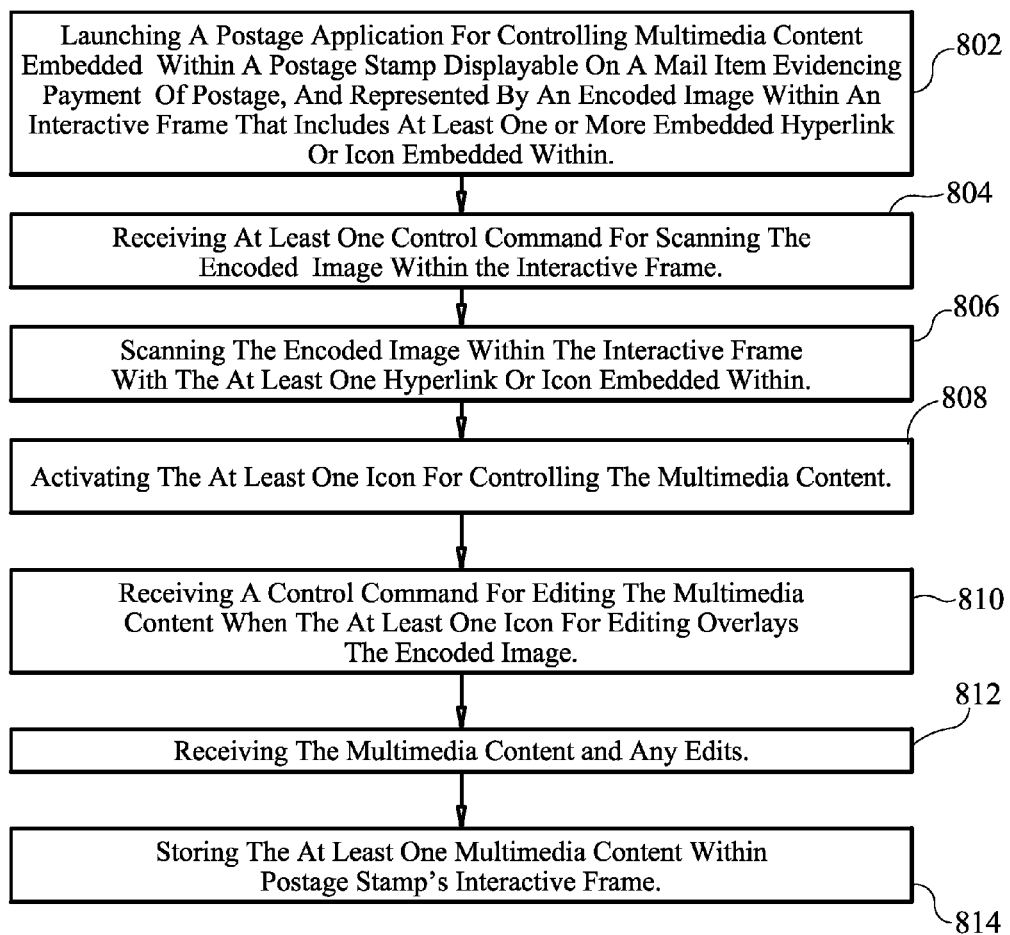
FIG. 8 shows another exemplary embodiment of the system of the invention.

FIG. 8 shows a block diagram depicting a method 700 in accordance with one embodiment. In some embodiments, user may want to add multimedia content 110 to the postage stamp 100 or the interactive card 502 or edit preprinted multimedia content 110 for the postage stamp 100 or the interactive card 502. as such, method 800 comprises launching a postage application 110 for controlling multimedia content 110 embedded within a postage stamp 100 displayable on a mail item 102 evidencing payment of postage, and represented by an encoded image 104 within an interactive frame 106 that includes at least one or more embedded hyperlink or icon embedded within (step 802).

Method 800 further comprises receiving at least one control command 302 for scanning the encoded image 102 within the interactive frame 106 (step 804); scanning the encoded image 102 within the interactive frame 106 with the at least one or more hyperlinks or icons 108, 108' embedded within (step 806). Method 800 further comprises activating the at least one icon 108 for controlling the multimedia content 110 (step 808); receiving a control command 302 for editing the multimedia content 110 when the at least one icon 108 for editing overlays the encoded image 104 (step 810). Editing may include adding, deleting, modifying and the like.

A such, method 800 comprises receiving the multimedia content 110 and any edits, which may further include the step of uploading content or retrieving stored content from for example the mobile communication device's memory means 218. Upon receiving the edits, method 800 comprises storing the at least one multimedia content 110 within postage stamp's interactive frame 108.

Hardware and Operating Environment

This section provides an overview of example hardware and the operating environments in conjunction with which embodiments of the inventive subject matter can be implemented.

A software program may be launched from a computer readable medium in computer-based systems 100-500 to execute the functions defined in the software program. Various programming languages may be employed to create software programs designed to implement and perform the methods disclosed herein. The programs may be structured in an object-orientated format using an object-oriented language such as Java or C++. Alternatively the programs may be structured in a procedure-oriented format using a procedural language, such as assembly or C. The software components may communicate using a number of mechanisms, such as application program interfaces, or inter-process communication techniques, including remote procedure calls. The teachings of various embodiments are not limited to any particular programming language or environment. Thus, other embodiments may be realized, as discussed regarding FIG. 9 below.

Figure 9:
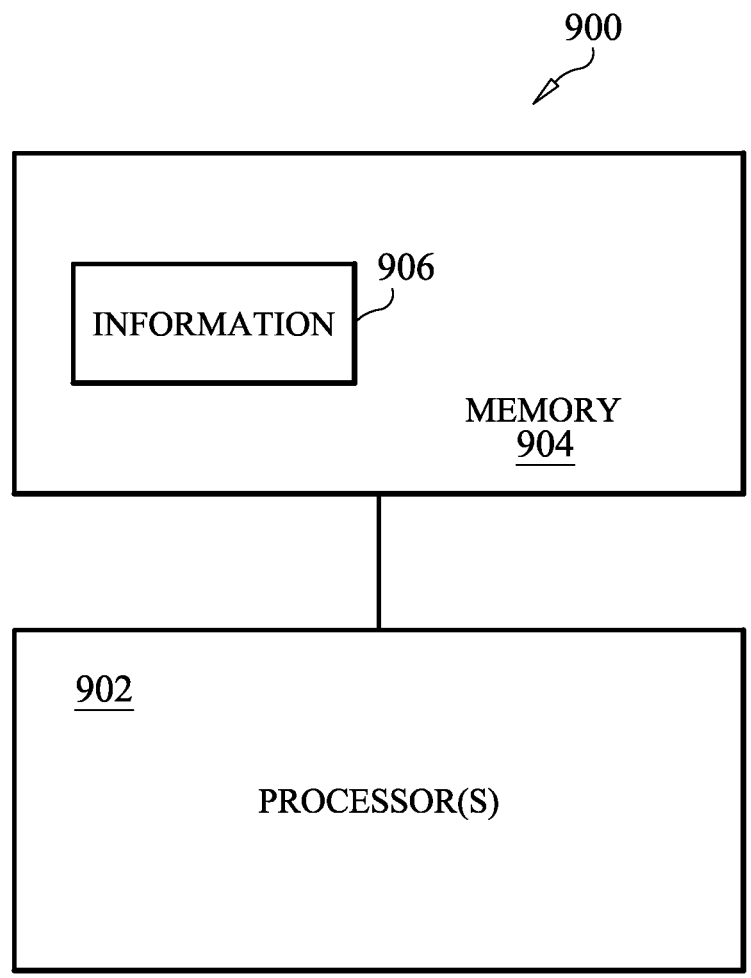
FIG. 9 is a block diagram representing an apparatus according to various embodiments.

FIG. 9 is a block diagram representing an apparatus 900 according to various embodiments. Such embodiments may comprise a computer, a memory system, a magnetic or optical disk, some other storage device, or any type of electronic device or system. The apparatus 900 may include one or more processor(s) 904 coupled to a machine-accessible medium such as a memory 902 (e.g., a memory including electrical, optical, or electromagnetic elements). The medium may contain associated information 904 (e.g., computer program instructions, data, or both) which, when accessed, results in a machine (e.g., the processor(s) 904) performing the activities previously described herein.

The principles of the present disclosure may be applied to all types of computers, systems, and the like, include desktop computers, servers, notebook computers, personal digital assistants, microcomputers, and the like. However, the present disclosure may not be limited to the personal computer.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed is:

1. An interactive postage stamp displayable on a mail item evidencing payment of postage, and includes an encoded image framed by an interactive frame that includes at least one embedded icon, activated for display on a mobile communication device when the mobile communication device's image capturing means scans the interactive frame causing the activation of the at least one embedded icon, where upon activation the at least one embedded icon becomes visible and may be engaged for accessing the multimedia content linked to the interactive postage stamp, and for controlling the review of the multimedia content using control commands represented by the activated at least one embedded icon or at least one hyperlink.

2. The interactive postage stamp of claim 1, wherein the at least one media content comprises of any one or more of the following: text, pictorial, video, audio, or graphics.

3. The interactive postage stamp of claim 1, further comprising a denomination representative of applicable costs for mail delivery.

4. The interactive postage stamp of claim 1, wherein the interactive postage stamps are purchasable from a postal administrator or other authorized vendor and usable for paying for mail delivering costs.

5. The interactive postage stamp of claim 1, further comprising adhesive on the interactive postage stamp's rear for being securely affixed to an envelope or other postal cover.

6. A system comprising of:

An interactive postage stamp displayable on a mail item evidencing payment of postage, and includes an encoded image framed by an interactive frame that includes at least one embedded icon, activated for display on a mobile communication device when the mobile communication device's image capturing means scans the interactive frame causing the activation of the at least one embedded icon, where upon activation the at least one embedded icon becomes visible and may be engaged for accessing the multimedia content linked to the interactive postage stamp, and for controlling the review of the multimedia content using control commands represented by the activated at least one embedded icon or at least one hyperlink; and the image capturing device electronically connected to at least one computer processor for scanning the interactive frame to access the multimedia content;

the at least one computer processor, electronically connected to a non-transitory computer readable medium, wherein the at least one computer processor includes computer executable instructions readable and executable by the at least one computer processor and is configured for launching an interactive application program, programmed for using the command associated with the activated at least one icon to control the multimedia content.

7. The system of claim 6, wherein the at least one multimedia content includes any one or more of the following: videos, promotions, greetings, and messages.

8. The system of claim 6, wherein the postage application is further configured for displaying the at least one multimedia content within the interactive frame with full functionality for review and control.

9. The system of claim 6, wherein the at least one control command for displaying the at least one multimedia content include but are not limited to any one or more of the following: play, stop, fast-forward, rewind, pause, maximize viewing, minimize, end and cancel.

10. The system of claim 6, wherein the postage application is further configured for retrieving the at least one multimedia content by linking to a website or other electronic address.

11. A method comprising:

using at least one computer processor, electronically connected to a non-transitory computer readable medium, wherein the at least one computer processor includes computer executable instructions readable and executable by the computer processor and is configured for launching a postage application program, configured for performing any one or more of the following:

launching the postage application program enabled for controlling multimedia content correlating to an interactive postage stamp displayable on a mail item that includes an encoded image within an interactive frame that includes at least one embedded icon embedded within;

receiving at least one control command for scanning the encoded image within the interactive frame;

scanning the encoded image within the interactive frame with the at least one icon embedded within;

activating for display the at least one icon for controlling the multimedia content, wherein upon activation the at least one embedded icon becomes visible and is enabled for engagement to access and control the multimedia content;

receiving a control command to control the multimedia content; and controlling the at least one multimedia content correlating to encoded image responsive to the control command.

12. The method of claim 11, further comprising displaying the at least one multimedia content within the interactive frame with full functionality for implementing review and control commands.

13. The method of claim 12, wherein the review and control commands include any one or more of the following: play, stop, fast-forward, rewind, pause, maximize viewing, minimize, and cancel.

14. The method of claim 11, further comprising retrieving the at least one multimedia content for displaying on a mobile communication device's displaying means, the postage stamp or mail item.

15. The method of claim 11, wherein the step of retrieving the at least one multimedia content further comprises retrieving the encoded image from any one of the following: the mobile device's memory means; hyperlinking to an advertiser's website via its web address, or hyperlinking to the application's memory means.

16. The method of claim 11, further comprising overlaying the encoded image with an activated icon.

\* \* \* \* \*